United States Patent
Ohara et al.

(10) Patent No.: US 11,460,579 B2
(45) Date of Patent: Oct. 4, 2022

(54) ROAD SURFACE DETECTION DEVICE

(71) Applicant: HONDA MOTOR CO., LTD., Tokyo (JP)

(72) Inventors: Kazuma Ohara, Wako (JP); Naoki Mori, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 317 days.

(21) Appl. No.: 16/812,913

(22) Filed: Mar. 9, 2020

(65) Prior Publication Data
US 2020/0292707 A1 Sep. 17, 2020

(30) Foreign Application Priority Data

Mar. 11, 2019 (JP) .............................. JP2019-043405

(51) Int. Cl.
*G01S 17/89* (2020.01)
*G05D 1/02* (2020.01)
(Continued)

(52) U.S. Cl.
CPC ............ *G01S 17/89* (2013.01); *G01S 13/867* (2013.01); *G01S 17/86* (2020.01); *G05D 1/0214* (2013.01); *G05D 2201/0213* (2013.01)

(58) Field of Classification Search
CPC .......... G01S 17/89; G01S 17/04; G01S 17/06; G01S 17/86; G01S 17/931; G01S 13/89;
(Continued)

(56) References Cited

U.S. PATENT DOCUMENTS 8,364,334 B2 * 1/2013 Au .......................... G05D 1/027
701/23
8,537,338 B1 * 9/2013 Medasani ............... G01S 17/89
382/104
(Continued)

FOREIGN PATENT DOCUMENTS

JP 2009-205360 A 9/2009
JP 2017-223511 A 12/2017
(Continued)

OTHER PUBLICATIONS

Office Action dated Apr. 26, 2022 issued over the corresponding Japanese Patent Application No. 2019-043405 with the English translation thereof.

*Primary Examiner* — Russell Frejd
*Assistant Examiner* — Brandon Z Willis
(74) *Attorney, Agent, or Firm* — Carrier Blackman & Associates, P.C.; Joseph P. Carrier; Jeffery T Gedeon

(57) ABSTRACT

A road surface detection device, which detects a road surface of a road on which a host vehicle runs, includes: a sensor configured to detect three-dimensional positional information at individual detection points by scanning a layer that includes the road surface; and an external environment recognition unit configured to calculate two-dimensional positional information in which positional information in a height direction has been removed from the positional information at the individual detection points included in the layer, to calculate, based on the two-dimensional positional information, a point sequence of the individual detection points in a two-dimensional coordinate plane, and to detect a trench existing in the road surface in accordance with a state of change of the point sequence.

6 Claims, 9 Drawing Sheets

(51) Int. Cl.
   *G01S 17/86* (2020.01)
   *G01S 13/86* (2006.01)
(58) Field of Classification Search
   CPC .... G01S 13/867; G01S 13/865; G01S 13/931; G05D 1/0214; G05D 1/0257; G05D 1/0246; G05D 2201/0213; G05D 2201/02; B60W 40/06; B60W 2552/35; B60W 2420/52; B60W 2420/403; B60W 2420/42
   See application file for complete search history.

(56) References Cited

U.S. PATENT DOCUMENTS

| | | | |
|---|---|---|---|
| 10,169,680 B1 * | 1/2019 | Sachdeva | G06T 15/30 |
| 11,245,888 B2 * | 2/2022 | Sadasue | G06T 7/593 |
| 2013/0046471 A1 * | 2/2013 | Rahmes | G01S 17/88 |
| | | | 702/5 |
| 2013/0155061 A1 * | 6/2013 | Jahanshahi | G06T 7/0004 |
| | | | 345/419 |

FOREIGN PATENT DOCUMENTS

| | | | |
|---|---|---|---|
| JP | 2017223511 | * | 12/2017 |
| JP | 2018-155694 A | | 10/2018 |

* cited by examiner

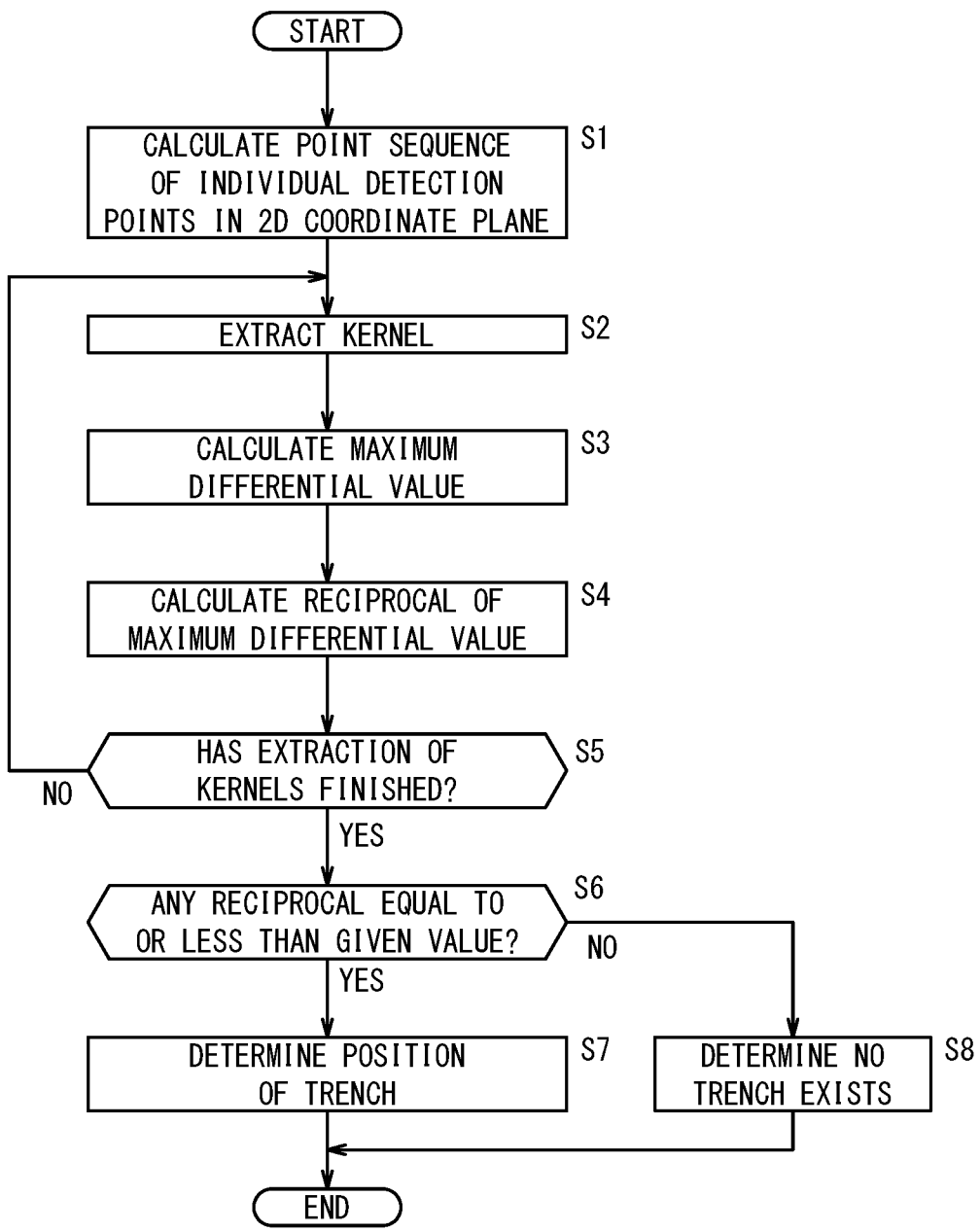

ROAD SURFACE DETECTION DEVICE

CROSS-REFERENCE TO RELATED APPLICATION

This application is based upon and claims the benefit of priority from Japanese Patent Application No. 2019-043405 filed on Mar. 11, 2019, the contents of which are incorporated herein by reference.

BACKGROUND OF THE INVENTION

Field of the Invention

The present invention relates to a road surface detection device for detecting the surface of a road on which a host vehicle runs.

Description of the Related Art

Japanese Laid-Open Patent Publication No. 2017-223511 discloses a device for detecting the ground and wall surfaces by clustering a group of three-dimensional points obtained by LiDAR.

SUMMARY OF THE INVENTION

The device described in Japanese Laid-Open Patent Publication No. 2017-223511 does not detect a trench or ditch provided in the road. Information about the configuration of the road surface is important for autonomous driving of a vehicle, and it is therefore desirable to highly accurately detect the configuration of the road surface, such as the presence or absence of a trench and the position of the trench.

The present invention has been devised taking such a problem into account, and an object of the present invention is to provide a road surface detection device capable of detecting a trench highly accurately.

An aspect of the present invention is directed to a road surface detection device that detects a road surface of a road on which a host vehicle runs. The road surface detection device includes:

a sensor configured to detect three-dimensional positional information at individual detection points by scanning a layer that includes the road surface; and an external environment recognition unit configured to calculate two-dimensional positional information in which positional information in a height direction has been removed from the positional information at the individual detection points included in the layer, to calculate, based on the two-dimensional positional information, a point sequence of the individual detection points in a two-dimensional coordinate plane, and to detect a trench existing in the road surface in accordance with a state of change of the point sequence.

According to the present invention, it is possible to detect a trench highly accurately.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flowchart illustrating road surface detection processing performed according to a first embodiment;

DESCRIPTION OF THE PREFERRED EMBODIMENTS

The road surface detection device according to the present invention will now be described in detail referring to the accompanying drawings in conjunction with preferred embodiments.

1. First Embodiment

Figure 3A:
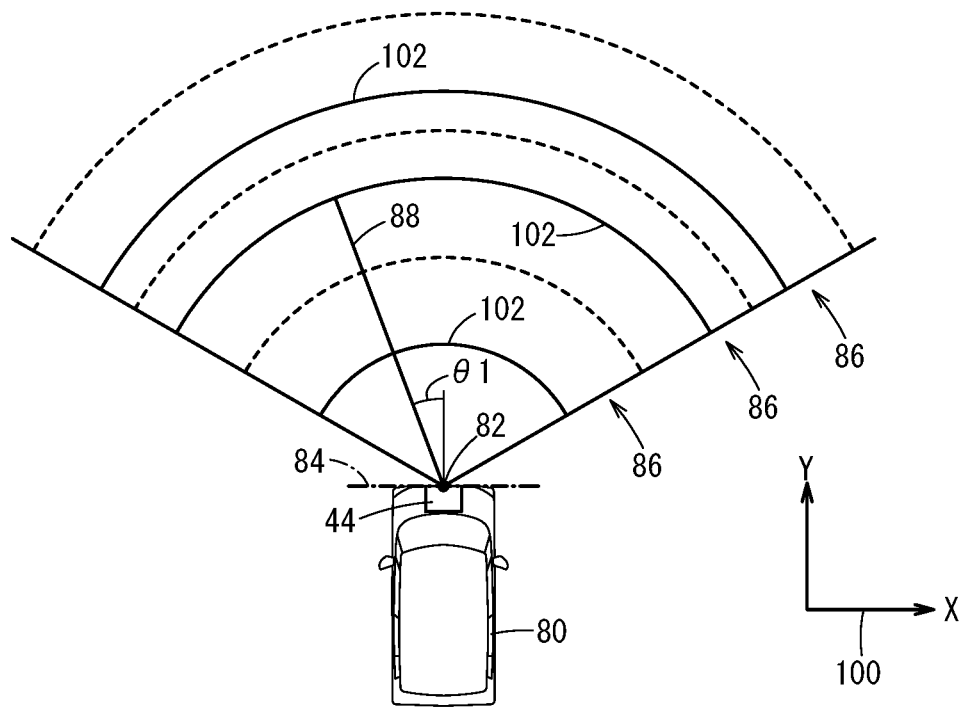
FIGS. 3A and 3B are schematic diagrams illustrating scanning of a flat road surface.

A first embodiment described below supposes a road surface detection device 76 (FIG. 1) that is used for a vehicle control device 10 of a host vehicle 80 (FIG. 3A etc.). The host vehicle 80 can be switched between manual driving in which a vehicle occupant controls the driving (vehicle controls such as acceleration, deceleration, and steering) and automated driving in which at least part of the driving controls is automated.

[1.1. Configuration of Vehicle Control Device 10]

A configuration of the vehicle control device 10 will be described referring to FIG. 1. The vehicle control device 10 includes a control unit 12, a group of input devices configured to input various kinds of information to the control unit 12, and a group of output devices configured to operate the host vehicle 80 based on various kinds of information outputted from the control unit 12. The group of input devices includes external environment sensors 14, a navigation device 16, a positioning unit 18, a communication unit 20, vehicle behavior sensors 22, and operation sensors 24. The group of output devices includes a driving force output device 28, a braking device 30, a steering device 32, and an HMI 34.

[1.1.1. Configuration of Group of Input Devices]

The external environment sensors 14 include one or more cameras 40, one or more radars 42, and one or more LiDARs 44. The camera(s) 40 capture images of the environment around the host vehicle 80 and outputs the image information to the control unit 12. The radar(s) 42 detect targets around the host vehicle 80 and outputs the detected information to the control unit 12. The LiDAR(s) 44 detect targets and a road 90 around the host vehicle 80 and outputs the detected information to the control unit 12.

The navigation device 16 identifies the position of the host vehicle 80 by GPS etc., generates a traveling route from the position of the host vehicle 80 to a destination specified by the vehicle occupant, referring to map information of a first map 46, and then outputs the traveling route information to the control unit 12.

Figure 3B:
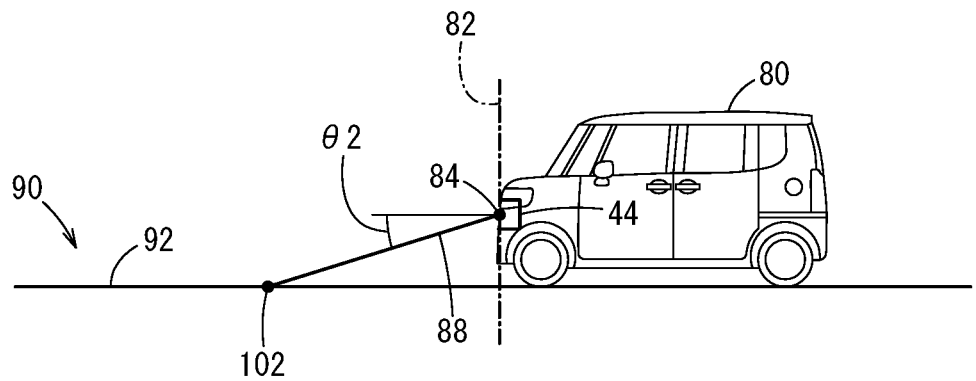

The positioning unit 18 outputs to the control unit 12 positional information indicating the position of the host vehicle 80 identified by a GNSS 48 and an IMU 50 and map information of a second map 52. The second map 52 includes map information that is more accurate and more detailed than the first map 46, including, for example, the number of lanes, position of lanes, width of lanes, etc. included in the road 90 (FIG. 3B etc.).

The communication unit 20 includes communication equipment for receiving information transmitted from broadcasting stations, communication equipment for receiving information transmitted from roadside devices provided on the road 90, and communication equipment for receiving information transmitted from other vehicles than the host vehicle 80. The communication unit 20 outputs the various kinds of received information to the control unit 12.

The vehicle behavior sensors 22 include various sensors for measuring the behavior of the host vehicle 80, such as, for example, a speed sensor for detecting the traveling speed of the host vehicle 80, a yaw rate sensor for detecting the yaw rate of the host vehicle 80, and the like. The vehicle behavior sensors 22 output the various kinds of detected information to the control unit 12.

The operation sensors 24 include various switches and sensors for detecting operations performed by the vehicle occupant, such as an automated driving switch for giving instructions for switching between automated driving and manual driving, a turn-signal switch for giving instructions on the direction of indication by turn signals, an accelerator pedal sensor for detecting the amount of operation of the accelerator pedal, a brake pedal sensor for detecting the amount of operation of the brake pedal, a steering angle sensor for detecting the steering angle of the steering wheel, touch sensors provided on the steering wheel, and the like. The operation sensors 24 output the various kinds of detected information to the control unit 12.

[1.1.2. Configuration of Control Unit 12]

The control unit 12 is formed of ECU. The control unit 12 includes an input/output device 56, an operation device 58, and a storage device 60. The input/output device 56 includes AD converter circuitry, communication interface, drivers, and so on. The operation device 58 is formed of a processor including CPU etc., for example. The operation device 58 executes programs stored in the storage device 60 to realize various functions. Each function of the operation device 58 will be described in section [1.1.4.] later. The storage device 60 is formed of memory such as RAM, ROM, etc. The storage device 60 stores various programs, numerical information etc. used for the processing performed by the operation device 58, and so on.

[1.1.3. Configuration of Group of Output Devices]

The driving force output device 28 includes a driving force output ECU and actuators (including driving motor, throttle valve, etc.) that are to be controlled by the diving force output ECU. The driving force output device 28 controls the driving force in accordance with operations of the accelerator pedal performed by the vehicle occupant or instruction information (driving instructions) outputted from the control unit 12.

The braking device 30 includes a braking ECU and actuators (including brake actuator etc.) that are to be controlled by the braking ECU. The braking device 30 controls the braking force in accordance with operations of the brake pedal performed by the vehicle occupant or instruction information (braking instructions) outputted from the control unit 12.

The steering device 32 includes an electric power steering (EPS) ECU and actuators (including EPS actuator etc.) that are to be controlled by the EPSECU. The steering device 32 controls the steering angle in accordance with operations of the steering wheel performed by the vehicle occupant or instruction information (steering instructions) outputted from the control unit 12.

The HMI 34 includes display equipment and speaker equipment. The display equipment and speaker equipment output images and sounds in accordance with instruction information (notification instructions) outputted from the control unit 12.

[1.1.4. Functions of Operation Device 58]

Various functions that are realized by the operation device 58 will be described referring to FIG. 2. The operation device 58 functions as an external environment recognition unit 66, a host vehicle position recognition unit 68, an action planning unit 70, a vehicle control unit 72, and a notification control unit 74.

The external environment recognition unit 66 performs image processing employing image information outputted from the camera(s) 40 and object recognition employing information detected by the radar(s) 42 and LiDAR(s) 44, to thereby recognize conditions around the host vehicle 80. The host vehicle position recognition unit 68 recognizes the position of the host vehicle 80 on the basis of positional information outputted from the navigation device 16 or the positioning unit 18 and map information of at least one of the first map 46 and the second map 52.

The action planning unit 70 generates local map (dynamic map) including static information and dynamic information around the host vehicle 80, on the basis of the results of recognition made by the external environment recognition unit 66 and the results of recognition made by the host vehicle position recognition unit 68. The action planning unit 70 then determines an optimum action based on the local map and the conditions of the host vehicle 80 (traveling speed, steering angle, position), and calculates a traveling speed (or acceleration/deceleration speed) and generates a traveling route to realize that action.

The vehicle control unit 72 calculates an acceleration/deceleration speed for driving the host vehicle 80 at the traveling speed calculated by the action planning unit 70, and a steering angle for driving the host vehicle 80 along the traveling route generated by the action planning unit 70. The vehicle control unit 72 outputs instruction information indicating the acceleration/deceleration speed and steering angle to the driving force output device 28, braking device 30, and steering device 32, through the input/output device 56.

The notification control unit 74 outputs instruction information indicating the contents of notification to the HMI 34 through the input/output device 56, when some notification is required during the operations determined by the action planning unit 70.

[1.1.5. Configuration of Road Surface Detection Device 76]

The LiDAR(s) 44 and the control unit 12 constitute the road surface detection device 76. The arithmetic operations of the road surface detection device 76 are mainly performed by the external environment recognition unit 66 of the control unit 12. The results of detection made by the road surface detection device 76 are used by the action planning unit 70 of the control unit 12.

[1.2. Operations Performed by Road Surface Detection Device 76]

As shown in FIG. 3A, the LiDAR 44 performs a scan within a single layer 86 by varying an irradiation angle $\theta 1$ of laser light 88 around a first axis 82 that is parallel to the height direction. Further, as shown in FIG. 3B, the LiDAR 44 performs a scan in a plurality of layers 86 by varying an irradiation angle θ2 of the laser light 88 around a second axis 84 that is parallel to the horizontal direction, to thereby detect positional information (distance information) at individual detection points. The LiDAR 44 can detect positional information about a road surface 92 by illuminating the road surface 92 of the road 90 with the laser light 88.

Figure 4A:
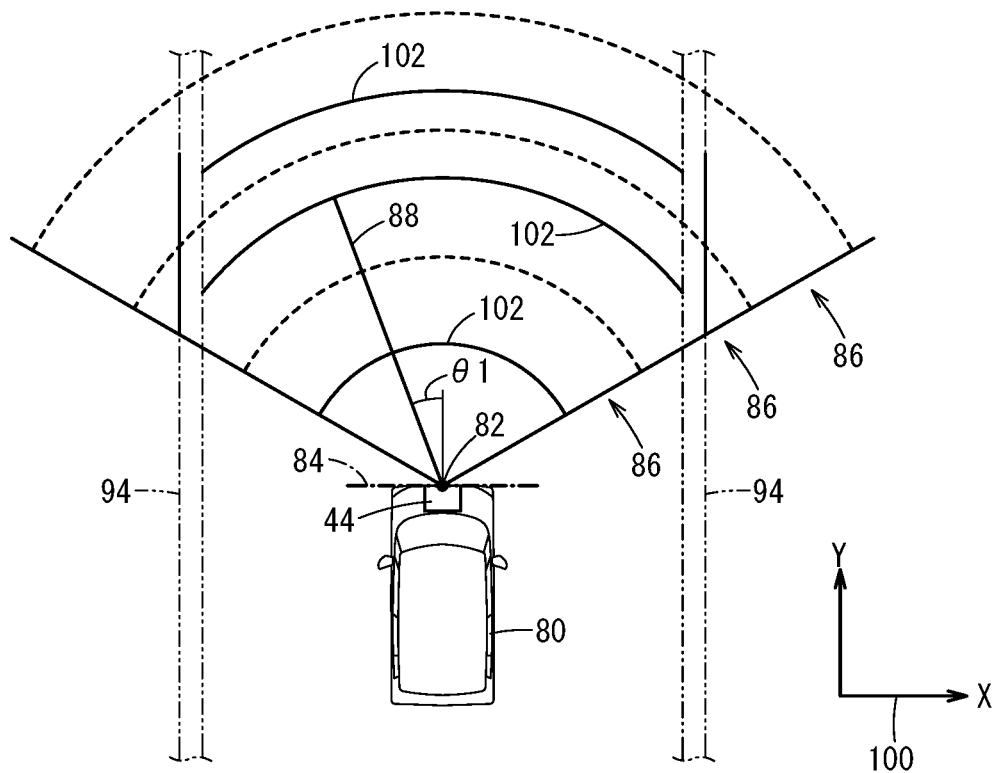
FIGS. 4A and 4B are schematic diagrams illustrating scanning of a road surface where trenches exist.

The positional information at individual detection points that is detected by the LiDAR 44 includes three-dimensional information. Suppose that two-dimensional positional information in which positional information in the height direction has been removed from the positional information at the detection points on the road surface 92 is projected into a two-dimensional coordinate plane. For example, as shown in FIGS. 3A and 4A, suppose, as the two-dimensional coordinate plane, a two-dimensional, first coordinate plane 100 that has a y axis parallel to the vehicle length direction and an x axis parallel to the vehicle width direction. When the host vehicle 80 runs on the straight road 90, the y axis of the first coordinate plane 100 is parallel to the direction in which the road 90 extends, and the x axis is parallel to the direction of the width of the road 90. In the first coordinate plane 100, the origin of the x axis and y axis corresponds to the position of the LiDAR 44.

When the road surface 92 is flat, as shown in FIG. 3A, a point sequence 102 of the detection points forms a circular arc with a substantially constant curvature around the LiDAR 44 in the first coordinate plane 100. Note that, in this specification, the point sequence 102 (and a point sequence 112 described later) is regarded as a line that connects the individual detection points. On the other hand, as shown in FIG. 4A, if trenches (or ditches) 94 exist at the edges of the road 90, the point sequence 102 of the detection points does not form a circular arc having a substantially constant curvature in the first coordinate plane 100.

Figure 4B:
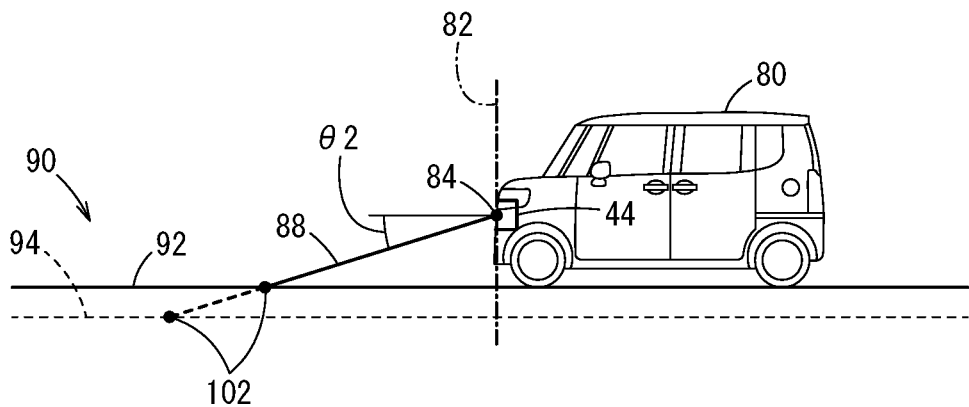

As shown in FIG. 3B, if the road surface 92 is flat, the distance from the LiDAR 44 to the road surface 92 that is detected in a single layer 86 is substantially constant. In contrast, as shown in FIG. 4B, if a trench 94 exists in the road 90, the distance from the LiDAR 44 to the road surface 92 and the distance from the LiDAR 44 to the trench 94, detected in a single layer 86, differ from each other. Accordingly, as shown in FIG. 4A, the point sequence 102 of the detection points changes at the positions of the trenches 94 in the first coordinate plane 100. In the first embodiment, the presence or absence of the trench 94 is determined by determining the presence or absence of the change, and the position of the trench 94 is detected by detecting the position of the change.

Figure 6:
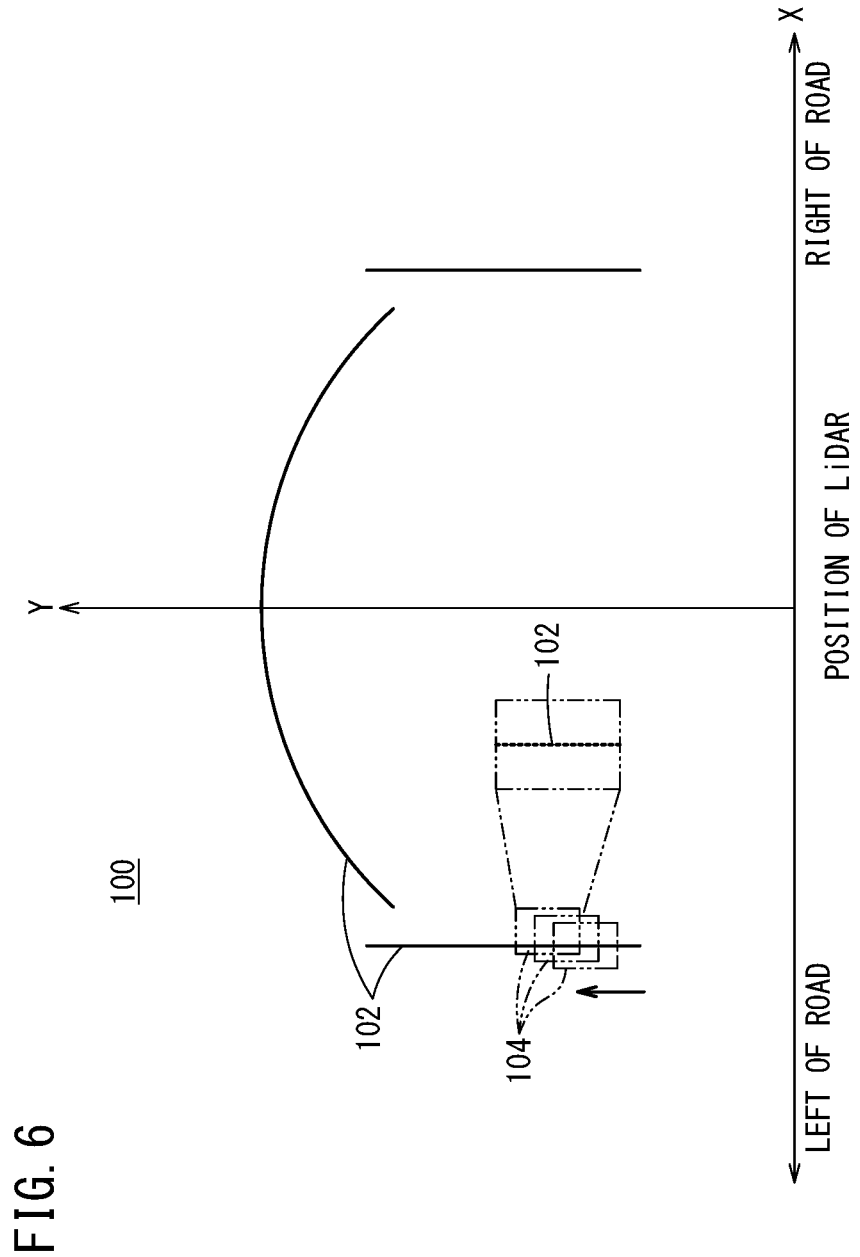
FIG. 6 is a schematic diagram illustrating a point sequence of detection points and kernels that are projected onto a first coordinate plane.

Now, referring to FIGS. 5 and 6, the road surface detection processing performed by the road surface detection device 76 of the first embodiment will be described. The series of operations explained below is performed after the LiDAR 44 has scanned one layer 86.

At step S1, the external environment recognition unit 66 calculates two-dimensional positional information in which positional information in the height direction has been removed from the positional information at the individual detection points included in the layer 86, and then calculates the point sequence 102 of the individual detection points in the two-dimensional, first coordinate plane 100 on the basis of the calculated positional information.

At step S2, the external environment recognition unit 66 performs an operation of extracting, from the point sequence 102, a partial point sequence including a given number (m) of successive detection points. In this specification, the partial point sequence is referred to as a kernel 104 (FIG. 6). In this processing, the external environment recognition unit 66 extracts the kernels 104 sequentially from one end to the other end of the point sequence 102. The kernel 104 is represented by expression 1 below.

$$P = \begin{pmatrix} x_0 x_1 & x_m \\ y_0 y_1 & \cdots & y_m \end{pmatrix} \quad (1)$$

At step S3, the external environment recognition unit 66 calculates a maximum differential value of the extracted kernel 104. The maximum differential value is calculated according to expression 2 below.

$$\operatorname{argmax} \Delta \begin{pmatrix} x_i \\ y_i \end{pmatrix} = \left| \begin{pmatrix} x_i \\ y_i \end{pmatrix} - \begin{pmatrix} x_{i+1} \\ y_{i+1} \end{pmatrix} \right| \quad (2)$$

At step S4, the external environment recognition unit 66 calculates the reciprocal of the maximum differential value. The reciprocal of the maximum differential value is calculated according to expression 3 below.

$$\text{Reciprocal of maximum differential value} = \frac{1}{\Delta \begin{pmatrix} x_{max} \\ y_{max} \end{pmatrix}} \quad (3)$$

At step S5, the external environment recognition unit 66 determines whether the extraction of kernels 104 has finished. If the extraction of kernels 104 has finished, that is, if the position of extraction of kernel 104 has reached the other end of the point sequence 102 (step S5: YES), then the process moves to step S6. On the other hand, if the extraction of kernels 104 has not finished (step S5: NO), i.e., if the position of extraction of kernel 104 has not yet reached the other end of the point sequence 102, then the process returns to step S2. Returning to step S2, the external environment recognition unit 66 performs an operation of shifting the position of the kernel 104 toward the other end of the point sequence 102 by a given number of detection points.

At step S6, the external environment recognition unit 66 determines if the reciprocals of the maximum differential values calculated for individual kernels 104 include any reciprocals of maximum differential values that are equal to or less than a given value. In this process, the external environment recognition unit 66 makes the determination as to the maximum differential value reciprocals in an area on the right or left of the position of the host vehicle 80 in the width direction of the road 90. For example, it covers the areas of x<−wv, wv<x in the first coordinate plane 100 and excludes the area of −wv≤x≤wv, where the area −wv≤x≤wv corresponds to the area of the host vehicle 80 in the width direction of the road 90. The given value is set in advance and stored in the storage device 60. If there is any reciprocal of maximum differential value that is equal to or less than the given value (step S6: YES), then the process moves to step S7. On the other hand, if there is no reciprocal of maximum differential value that is equal to or less than the given value (step S6: NO), then the process moves to step S8.

At step S7, the external environment recognition unit 66 determines that a trench 94 exists in the position of the kernels 104 where the reciprocals of maximum differential values equal to or less than the given value were calculated. In the point sequence 102, an interval between the detection points becomes equal to or greater than a given interval in this position. The action planning unit 70 shown in FIG. 2 generates a local map using the positional information on the trench 94 as static information.

At step S8, the external environment recognition unit 66 determines that no trench 94 exists in the road surface 92. The action planning unit 70 shown in FIG. 2 generates a local map where the trench 94 does not exist.

2. Second Embodiment

Figure 1:
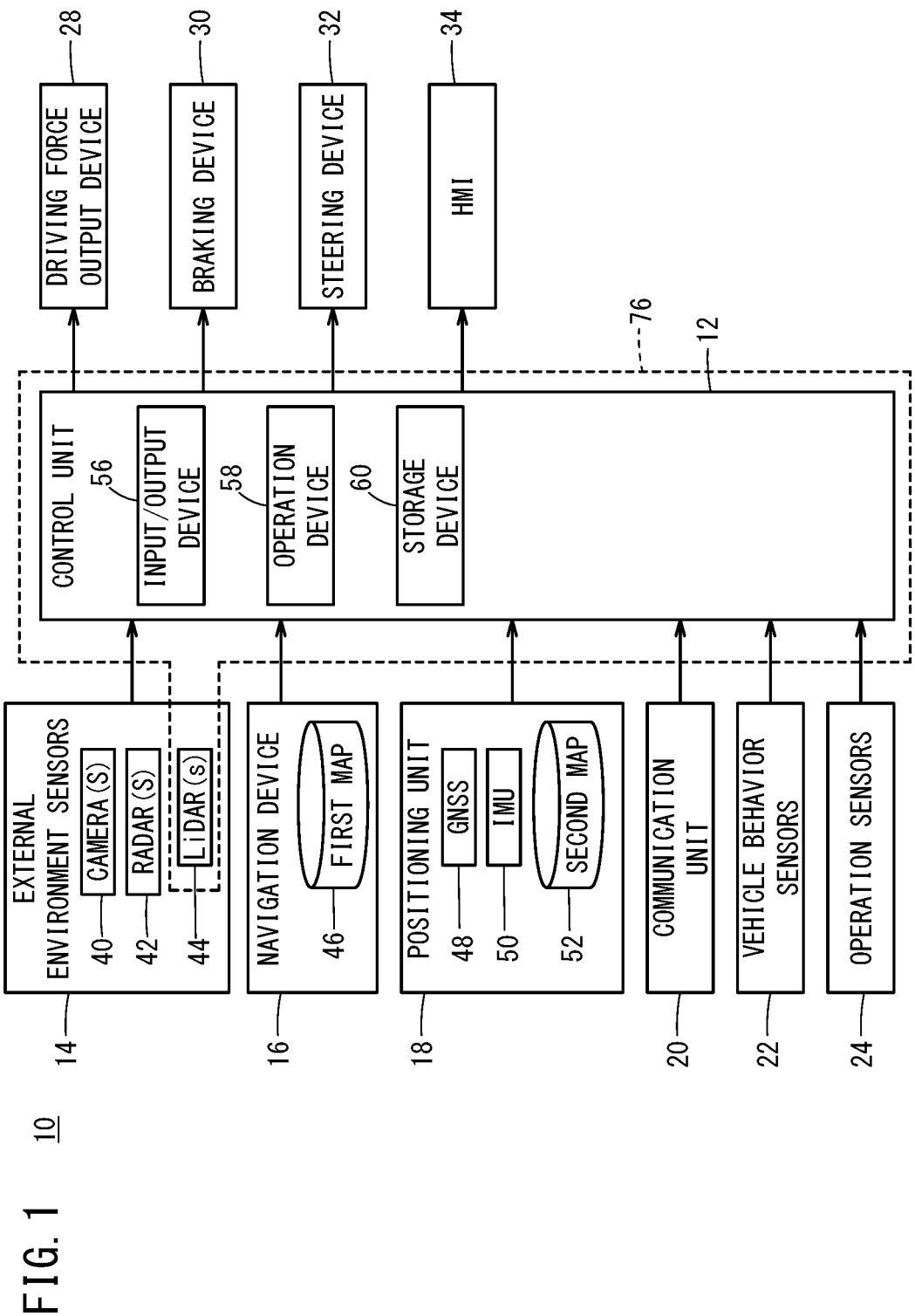
FIG. 1 is a block diagram of a vehicle control device including a road surface detection device.
Figure 2:
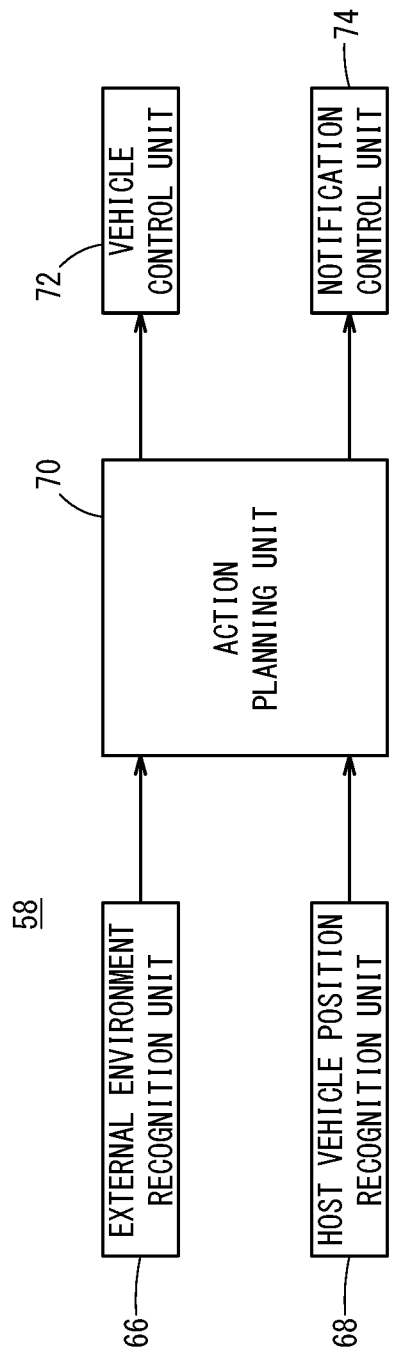
FIG. 2 is a functional block diagram of an operation device.

The configuration of a second embodiment is the same as the configuration of the first embodiment shown in FIGS. 1 and 2. The second embodiment is an application of the first embodiment.

[2.1. Processing Performed by Road Surface Detection Device 76]

Figure 7:
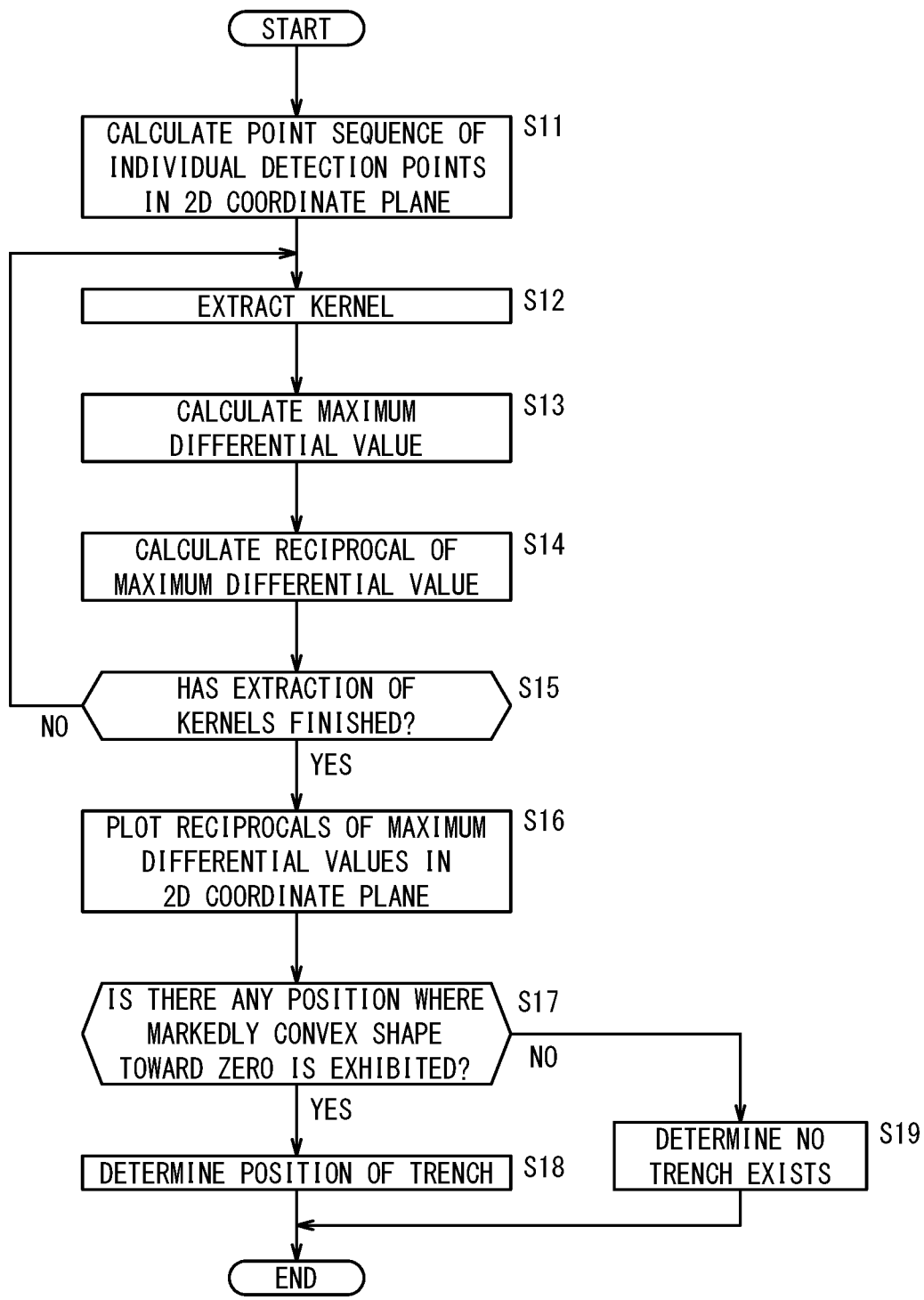
FIG. 7 is a flowchart illustrating road surface detection processing performed according to a second embodiment.
Figure 8:
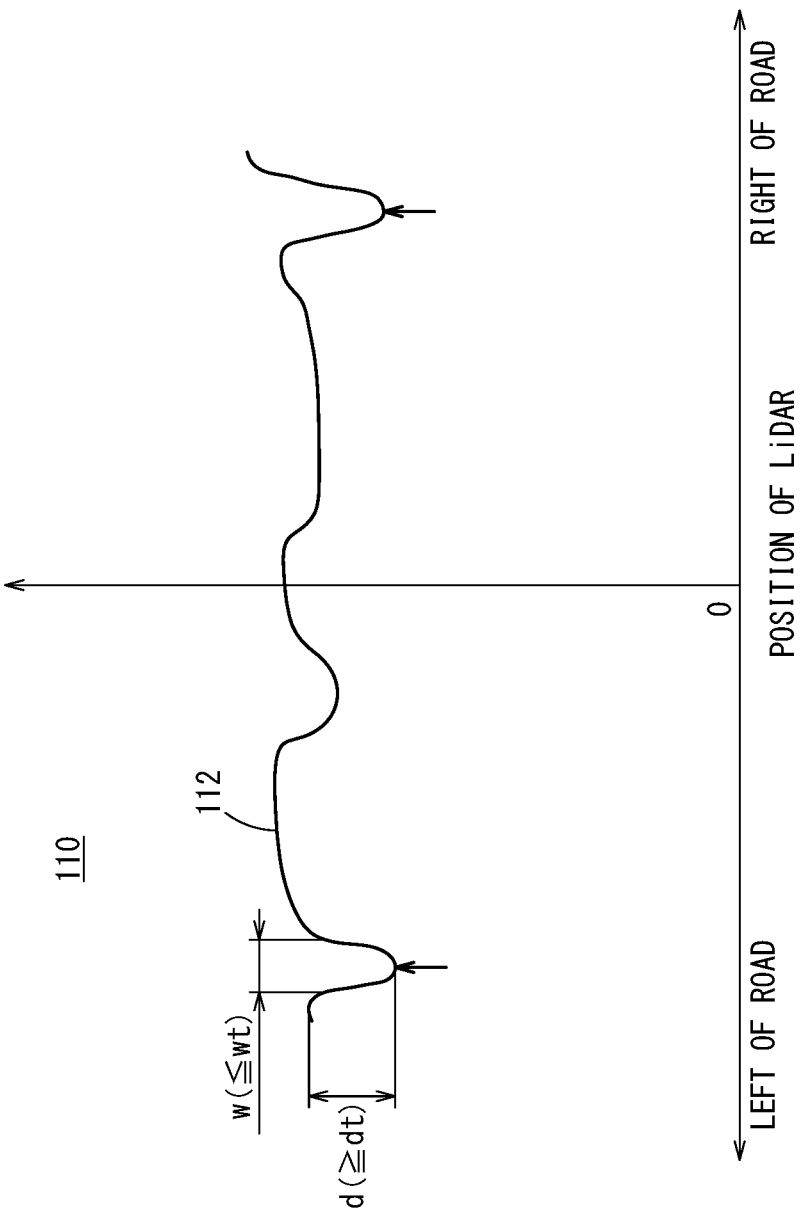
FIG. 8 is a schematic diagram illustrating a point sequence of the ratios of maximum differential values that are projected onto a second coordinate plane.

The road surface detection processing performed by a road surface detection device 76 of the second embodiment will be described referring to FIGS. 7 and 8. The series of operations described below is performed after the LiDAR 44 has scanned one layer 86. The operations in steps S11 to S15 shown in FIG. 7 are the same as the operations in steps S1 to S5 shown in FIG. 5 and therefore they are not described again.

At step S16, the external environment recognition unit 66 plots the reciprocals of maximum differential values in a two-dimensional coordinate plane. Here, as shown in FIG. 8, suppose a two-dimensional, second coordinate plane 110 that has a first coordinate axis indicating the position of kernels 104 in the width direction of the road 90 and a second coordinate axis indicating the reciprocals of maximum differential values. The origin of the first coordinate axis in the second coordinate plane 110 corresponds to the position of the LiDAR 44.

At step S17, the external environment recognition unit 66 determines whether, in the point sequence 112 of the reciprocals of maximum differential values plotted in the second coordinate plane 110, there is a position where the point sequence 112 of the reciprocals of maximum differential values is markedly convex toward zero. More specifically, the external environment recognition unit 66 determines whether there is any convex shape having a depth d that is equal to or greater than a given depth dt and a width w that is equal to or less than a given width wt. The values of the given depth dt and the given width wt are set in advance and stored in the storage device 60. It is possible to remove noise by these conditions. When there is any position where the point sequence 112 of the reciprocals of maximum differential values is markedly convex (step S17: YES), the process moves to step S18. On the other hand, if there is no position where the point sequence 112 of the reciprocals of maximum differential values is markedly convex (step S17: NO), then the process moves to step S19.

At step S18, the external environment recognition unit 66 determines that a trench 94 exists in the position where the point sequence 112 of the reciprocals of maximum differential values exhibits the convex shape. As in the first embodiment, in the point sequence 112, an interval between the detection points becomes equal to or greater than a given interval in this position. The action planning unit 70 shown in FIG. 2 generates a local map using the positional information about the trench 94 as static information.

At step S19, the external environment recognition unit 66 determines that there is no trench 94 in the road surface 92. The action planning unit 70 shown in FIG. 2 generates a local map where the trench 94 does not exist.

3. Third Embodiment

In the first and second embodiments, the external environment recognition unit 66 determines the presence or absence and position of the trench 94 on the basis of the results of scanning in a single layer 86. Further, the external environment recognition unit 66 may be configured to determine the presence of a trench 94 when the point sequences 102 in a plurality of layers 86 change in the same manner.

Figure 9:
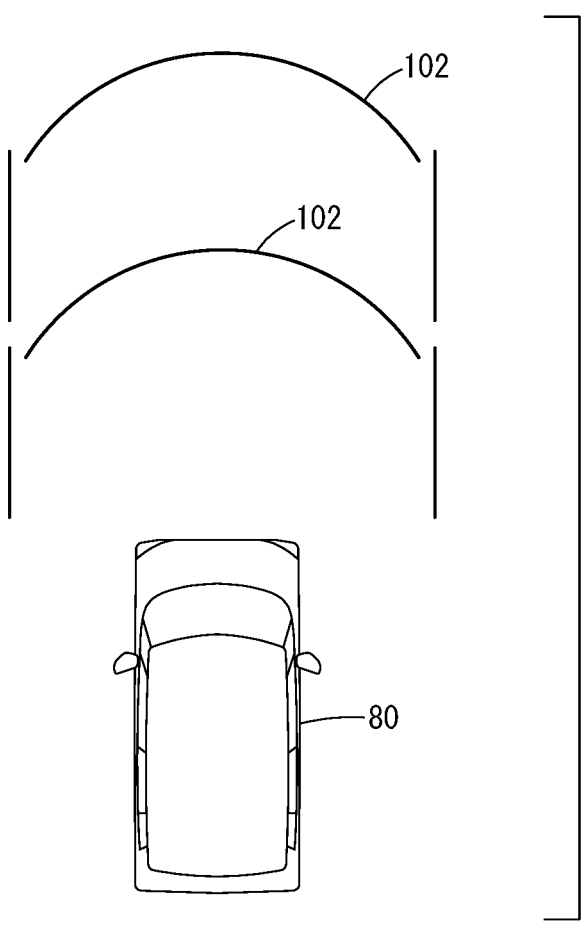
FIG. 9 is a schematic diagram used to explain a third embodiment.

For example, as shown in FIG. 9, the external environment recognition unit 66 determines that a trench 94 exists when the positions of change detected in individual layers 86 exist in the same position in the width direction in the two-dimensional first coordinate plane 100. Further, the external environment recognition unit 66 can determine the position where the trench 94 extends, by connecting the positions of change of the individual layers 86.

4. Technical Ideals Obtained by Embodiments

Technical Ideals graspable from the embodiments above will be recited below.

An aspect of the present invention is directed to a road surface detection device 76 that detects a road surface 92 of a road 90 on which a host vehicle 80 runs.

The road surface detection device 76 includes:

a sensor (LiDAR 44) configured to detect three-dimensional positional information at individual detection points by scanning a layer 86 that includes the road surface 92; and an external environment recognition unit 66 configured to calculate two-dimensional positional information in which positional information in a height direction has been removed from the positional information at the individual detection points included in the layer 86, to calculate, based on the two-dimensional positional information, a point sequence 102 of the individual detection points in a two-dimensional coordinate plane (first coordinate plane 100), and to detect a trench 94 existing in the road surface 92 in accordance with a state of change of the point sequence 102.

According to the configuration above, the trench 94 is detected based on a two-dimensional point sequence 102 that exhibits a change that is characteristic of the trench 94, so that the trench 94 can be detected highly accurately.

In the aspect of the present invention, the external environment recognition unit 66 may determine that a position where a position of the detection points rapidly changes is a position where the trench 94 exists.

In the aspect of the present invention, the external environment recognition unit 66 may determine that the trench 94 exists on a right or a left of a position of the host vehicle 80 in a width direction of the road 90 if there is a position where an interval that is equal to or greater than a given interval is present between the detection points that are adjacent to each other, in an area on the right or the left of the position of the host vehicle 80.

According to the configuration above, it is possible to detect the trench 94 more accurately because the trench 94 is detected in an area on the right or left of the position of the host vehicle 80.

In the aspect of the present invention, the external environment recognition unit 66 may determine that the trench 94 exists if the point sequences in a plurality of the layers 86 exhibit identical states of change.

According to the configuration above, the trench 94 can be detected further accurately. It is also possible to detect the position where the trench 94 extends.

In the aspect of the present invention, the external environment recognition unit 66 may perform an operation of extracting, from the point sequence, a partial point sequence (kernel 104) including a given number of detection points and an operation of calculating a maximum differential value of the partial point sequence (kernel 104) and a reciprocal of the maximum differential value, while shifting along the point sequence an area in which the partial point sequence (kernel 104) is extracted, and the external environment recognition unit 66 may determine that a position where the reciprocal of the maximum differential value becomes small is a position of the trench 94.

In the aspect of the present invention, the external environment recognition unit 66 may determine, as the position of the trench 94, a position in a width direction of the road 90 where the reciprocal of the maximum differential value exhibits a convex shape toward zero in a coordinate plane (second coordinate plane 110) that is different from the coordinate plane (first coordinate plane 100) and that has a first coordinate axis indicating a position of the partial point sequence (kernel 104) in the width direction of the road 90 and a second coordinate axis indicating the reciprocal of the maximum differential value of the partial point sequence (kernel 104).

In the aspect of the present invention, the external environment recognition unit 66 may determine, as the position of the trench 94, a position in the width direction of the road 90 where the reciprocal of the maximum differential value exhibits the convex shape that has a depth d not less than a given depth dt and a width w not more than a given width wt.

According to the configuration above, it is possible to remove noise to further accurately detect the trench 94.

The road surface detection device according to the present invention is not limited to the embodiments described above and various configurations are of course possible without departing from the essence and gist of the present invention.

What is claimed is:

1. A road surface detection device that detects a road surface of a road on which a host vehicle runs, the road surface detection device comprising:
   a light detection and ranging sensor that detects three-dimensional positional information at individual detection points by scanning a plurality of layers that include the road surface; and
   a processor that executes computer-executable instructions stored in a memory,
   wherein the light detection and ranging sensor scans the plurality of layers by varying irradiation angles of the laser light around a horizontal axis and scans each of the plurality of layers by varying the irradiation angles of laser light around a vertical axis,
   wherein the processor executes the computer-executable instructions to cause the road surface detection device to:
   calculate two-dimensional positional information in which positional information in a height direction has been removed from the positional information at the individual detection points included in each of the plurality of layers, to calculate, based on the two-dimensional positional information, point sequences of the individual detection points in a first two-dimensional coordinate plane, and
   determine that a trench exists if changing points in the point sequences of the plurality of layers are located at a same position in a width direction of the road.

2. The road surface detection device according to claim 1, wherein the processor causes the road surface detection device to determine that a position where a position of the detection points rapidly changes is a position where the trench exists.

3. The road surface detection device according to claim 1, wherein the processor causes the road surface detection device to determine that the trench exists in the width direction of the road if there is a position where an interval that is equal to or greater than a given interval is present between the detection points that are adjacent to each other, in an area on the right or the left of the position of the host vehicle.

4. The road surface detection device according to claim 1, wherein
   the processor causes the road surface detection device to perform an operation of extracting, from the point sequence, a partial point sequence including a given number of detection points and an operation of calculating a maximum differential value of the partial point sequence and a reciprocal of the maximum differential value, while shifting along the point sequence an area in which the partial point sequence is extracted, and
   the processor causes the road surface detection device to determine that a position where the reciprocal of the maximum differential value becomes small is a position of the trench.

5. The road surface detection device according to claim 4, wherein the processor causes the road surface detection device to determine, as the position of the trench, a position in the width direction of the road where the reciprocal of the maximum differential value exhibits a convex shape toward zero in a second coordinate plane that is different from the first coordinate plane and that has a first coordinate axis indicating a position of the partial point sequence in the width direction of the road and a second coordinate axis indicating the reciprocal of the maximum differential value of the partial point sequence.

6. The road surface detection device according to claim 5, wherein the processor causes the road surface detection device to determine, as the position of the trench, a position in the width direction of the road where the reciprocal of the maximum differential value exhibits the convex shape that has a depth not less than a given depth and a width not more than a given width.

* * * * *